United States Patent [19]
Ester et al.

[11] Patent Number: 6,163,527
[45] Date of Patent: Dec. 19, 2000

[54] METHOD AND APPARATUS FOR AN OPTICAL BI-DIRECTIONAL LINE SWITCHED RING DATA COMMUNICATIONS SYSTEM

[75] Inventors: Gary W. Ester, Plano; Don G. Dempsey, Grapevine, both of Tex.

[73] Assignee: Alcatel

[21] Appl. No.: 09/059,919

[22] Filed: Apr. 14, 1998

Related U.S. Application Data

[60] Provisional application No. 60/043,322, Apr. 15, 1997.

[51] Int. Cl.[7] .................................................. H04L 12/42
[52] U.S. Cl. .......................................... 370/228; 370/227
[58] Field of Search .................................... 370/221, 222, 370/223, 224, 225, 226, 227, 228, 217, 218, 216; 359/110, 118, 119, 128

[56] References Cited

U.S. PATENT DOCUMENTS

| | | | |
|---|---|---|---|
| 5,717,796 | 2/1998 | Clendening | 385/24 |
| 5,751,454 | 5/1998 | MacDonald | 370/222 |
| 5,844,889 | 12/1998 | Takatsu et al. | 370/223 |
| 5,903,371 | 5/1999 | Arecco et al. | 359/119 |

FOREIGN PATENT DOCUMENTS 0 651 528 A1  10/1993  European Pat. Off. ......... H04J 14/02

OTHER PUBLICATIONS

*Multiwavelength Survivable Ring Network Architectures* by A.F. Elrefaie for Bellcore of Red Bank, N.J. 07701, USA. Publication Date May 23, 1993.

*Transport Network Involving a Reconfigurable WDM Network Layer—A European Demonstration* by Sonny Johansson; Journal of Lightwave Technology. vol. 14, No. 6, Jun. 1996.

*Primary Examiner*—Huy D. Vu
*Attorney, Agent, or Firm*—Gary Cary Ware & Freidenrich LLP

[57] ABSTRACT

An optical bi-directional line switched ring for performing adding and dropping of traffic into the traffic path and for performing ring and/or span protection switching. The optical bi-directional line switched ring include a plurality of nodes, each node having multiple input demultiplexer/output multiplexer sections, a command and control channel having multiple fibers, and up to N-1 slave circuits. Each multiple input demultiplexer/output multiplexer sections has an input demultiplexer to receive and demultiplex signals from a fiber and an output multiplexer to receive the demultiplexed wavelengths from internally and multiplex them into an outgoing signal. The command and control channel can be a standard bi-directional line switch that has one channel coupled to each fiber of the system. Each slave circuit comprising a plurality optical switching circuits coupled to the multiple input demultiplexer/output multiplexer sections such that the optical switching circuits are operable to carry up to N wavelengths of traffic. The command and control channel in conjunction with a SONET bi-directional line switched ring monitors the plurality of lines in the bi-directional line switched ring to control the operation of the optical add/drop multiplexer in response to the sensed signals on the plurality of lines. If a disruption of traffic occurs, the command and control channel will so indicate and will use the optical switching circuits that are slaved to it to re-route and protect traffic.

37 Claims, 11 Drawing Sheets

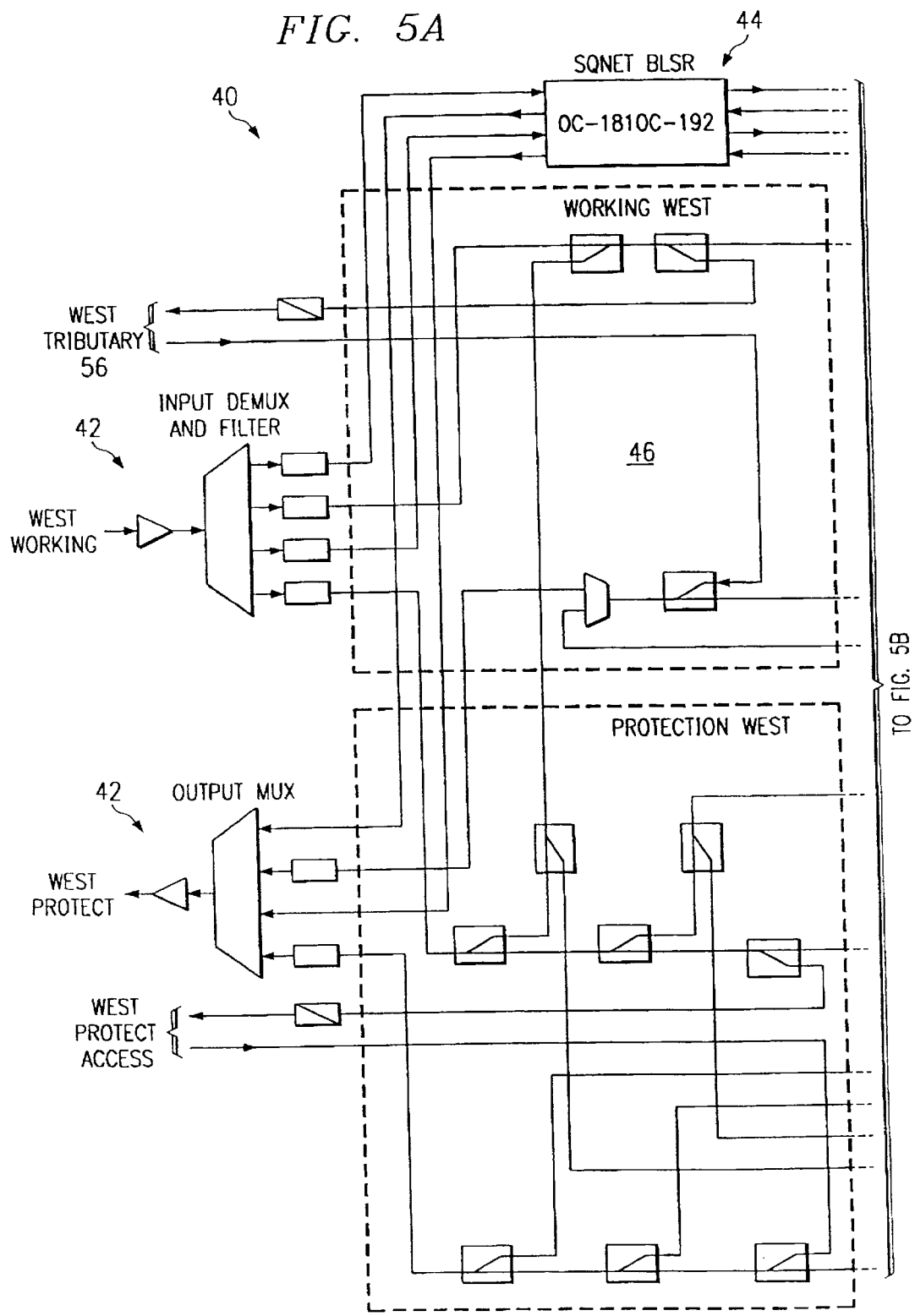

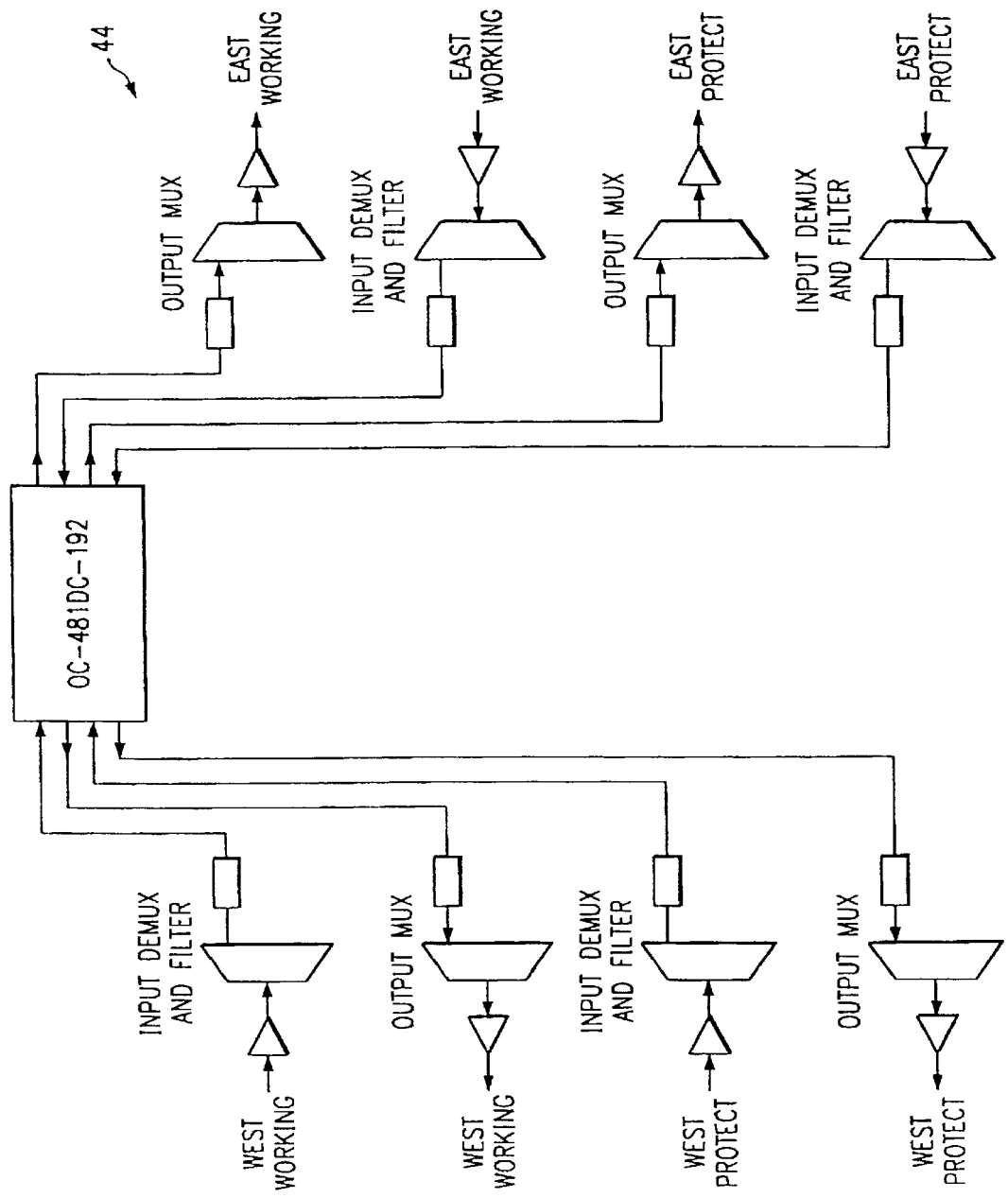

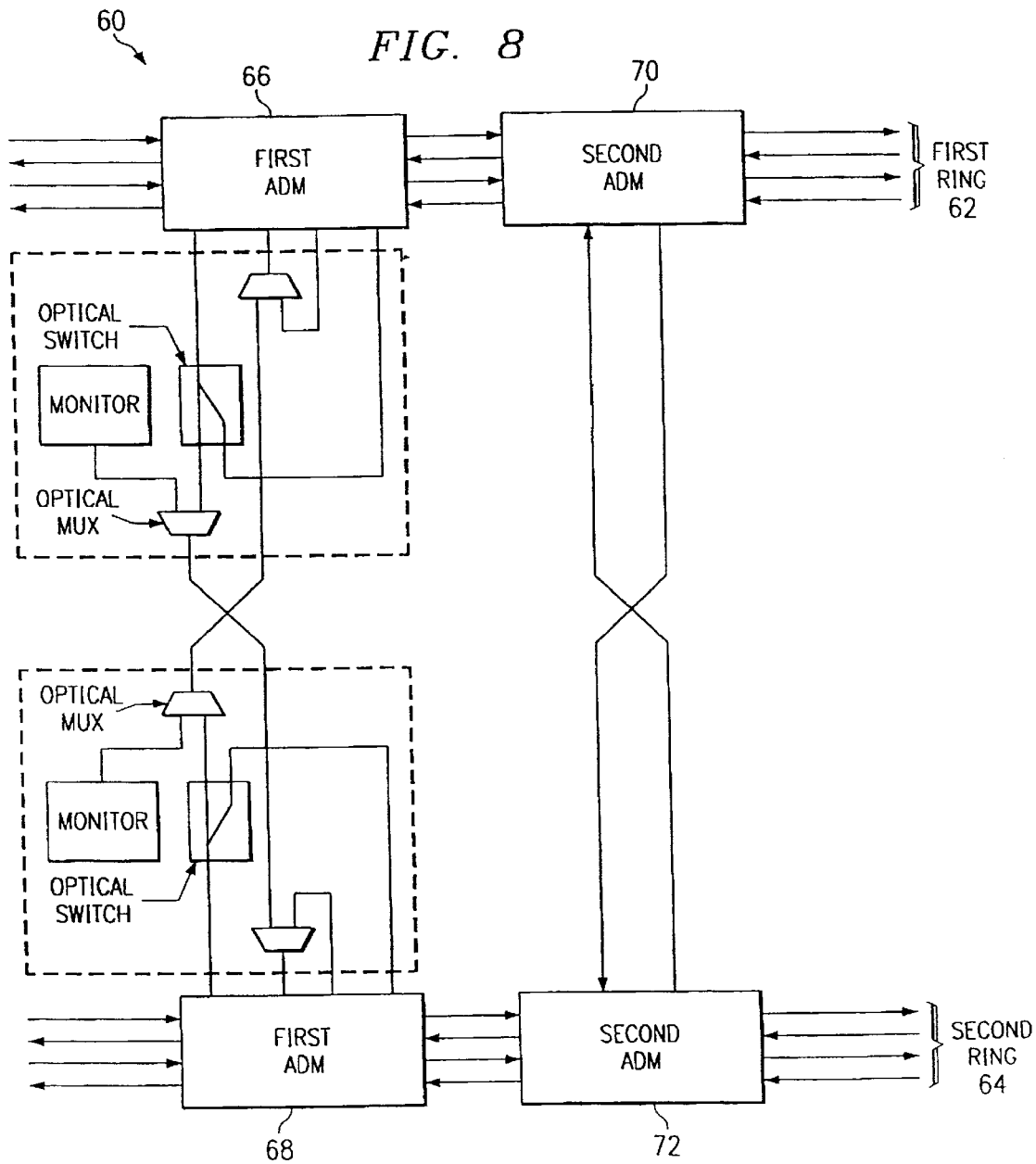

METHOD AND APPARATUS FOR AN OPTICAL BI-DIRECTIONAL LINE SWITCHED RING DATA COMMUNICATIONS SYSTEM

RELATED APPLICATION

This application claims priority under 35 U.S.C. § 119(e)(1) to provisional application No. 60/043,322 filed on Apr. 15, 1997.

TECHNICAL FIELD OF THE INVENTION

The present invention relates generally to data communication, and more specifically to a method and apparatus for an optical bi-directional line switched ring data communication system.

BACKGROUND OF THE INVENTION

Bi-directional rings are used in data communications systems to provide high-speed data transmission with a number of safeguards to ensure fault tolerance. Optical networks using bi-directional rings are used in such data communications systems, but a great deal of overhead is associated with converting signals into the proper format required by most optical ring systems.

Other problems with prior art optical bi-directional networks are associated with the routing of data when a fault occurs in the system. When multiple channels of data are being sent over the optical. media, it is difficult and expensive to individually control the routing of the channels when a fault occurs. This is because in prior-art systems each channel must have its own fault detection and rerouting circuitry.

For these reasons, a need exists for an optical bi-directional ring communications system that simply and efficiently provides a means of detecting faults in the media, allows for the adding and dropping traffic to and from the media, controls routing of signals in the network, and provides a maintenance channel, wherein such a ring is also compatible with equipment currently in use.

SUMMARY OF THE INVENTION

The present invention provides an optical add/drop multiplexer for use in telecommunications systems for allowing switching in the event of a path or system failure that substantially eliminates or reduces disadvantages and problems associated with previously developed protection systems and methods.

More specifically, the present invention provides an optical add/drop multiplexer for use in, for example, a multiple fiber optical bi-directional line switched ring capable of transporting N wavelengths of signals. Each optical ADM node can include multiple input demultiplexer/output multiplexer sections, a command and control channel having multiple fibers, and up to N-1 slave circuits. Each multiple input demultiplexer/output multiplexer sections has an input demultiplexer to receive and demultiplex signals from a fiber and an output multiplexer to receive the demultiplexed wavelengths from internally and multiplex them into an outgoing signal. The command and control channel can be a standard bi-directional line switch that has one channel coupled to each fiber of the system. Each slave circuit comprising a plurality optical switching circuits coupled to the multiple input demultiplexer/output multiplexer sections such that the optical switching circuits are operable to carry up to N wavelengths of traffic. The command and control channel in conjunction with a SONET bi-directional line switched ring monitors the plurality of lines in the bi-directional line switched ring to control the operation of the optical add/drop multiplexer in response to the sensed signals on the plurality of lines. If a disruption of traffic occurs, the command and control channel will so indicate and will use the optical switching circuits that are slaved to it to re-route and protect traffic.

The present invention is equally applicable to two fiber bi-directional line switch rings as well as four fiber bi-directional line switch rings.

The present invention is further applicable to other optical telecommunications systems in addition to bi-directional line switch rings.

BRIEF DESCRIPTION OF THE DRAWINGS

For a more complete understanding of the present invention, and for further features and advantages, reference is now made to the following description taken in conjunction with the accompanying drawings, in which:

FIG. 6 illustrates a schematic diagram of an electrical ADM used for control of an optical four-fiber bi-directional line switched ring communications system in accordance with the present invention;

FIG. 8 illustrates a schematic diagram of a dual-node interconnected ring system in accordance with the present invention.

DETAILED DESCRIPTION OF THE INVENTION

The present invention provides a method and apparatus for an optical four-fiber bi-directional line switched ring communication system.

Figure 1:
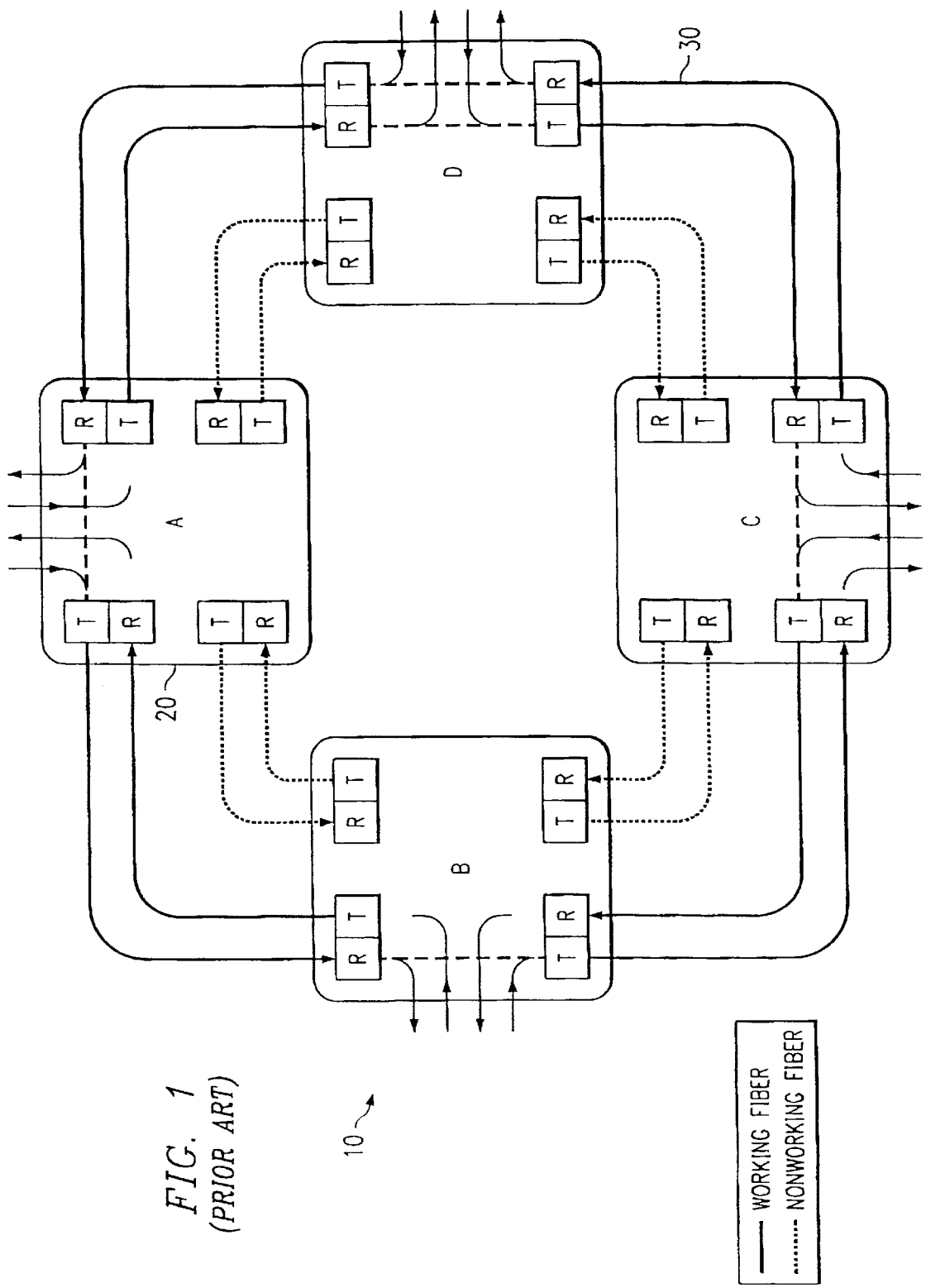
FIG. 1 illustrates a prior art bi-directional ring communication system.

FIG. 1 illustrates a bi-directional ring 10 which is currently known in the art. It consists of a set of two or more nodes (labeled A, B, C and D), referred to as Add/Drop Multiplexers (ADMS) 20 connected by ring of bi-directional traffic paths 30. The ADMs 20 are the locations at which traffic (phone traffic or data in telecommunications applications) may be placed in a traffic path (added) for delivery to another ADM 20 where the traffic is extracted off the ring (dropped). The path provides a way for traffic to get from the adding ADM (example labeled A in FIG. 1) through any intermediate ADMs (labeled B and C) to where it is dropped at the terminating ADM (labeled D). The path may be reused for other traffic between other points elsewhere in the ring. The paths around the ring are divided into two equally sized groups consisting of a working group and a protection group. Traffic is normally only inserted into paths in the working group with the protection group being reserved for use during ring failures. Traffic may also be inserted into a protection path but such traffic is not protected during failure scenarios.

Figure 2:
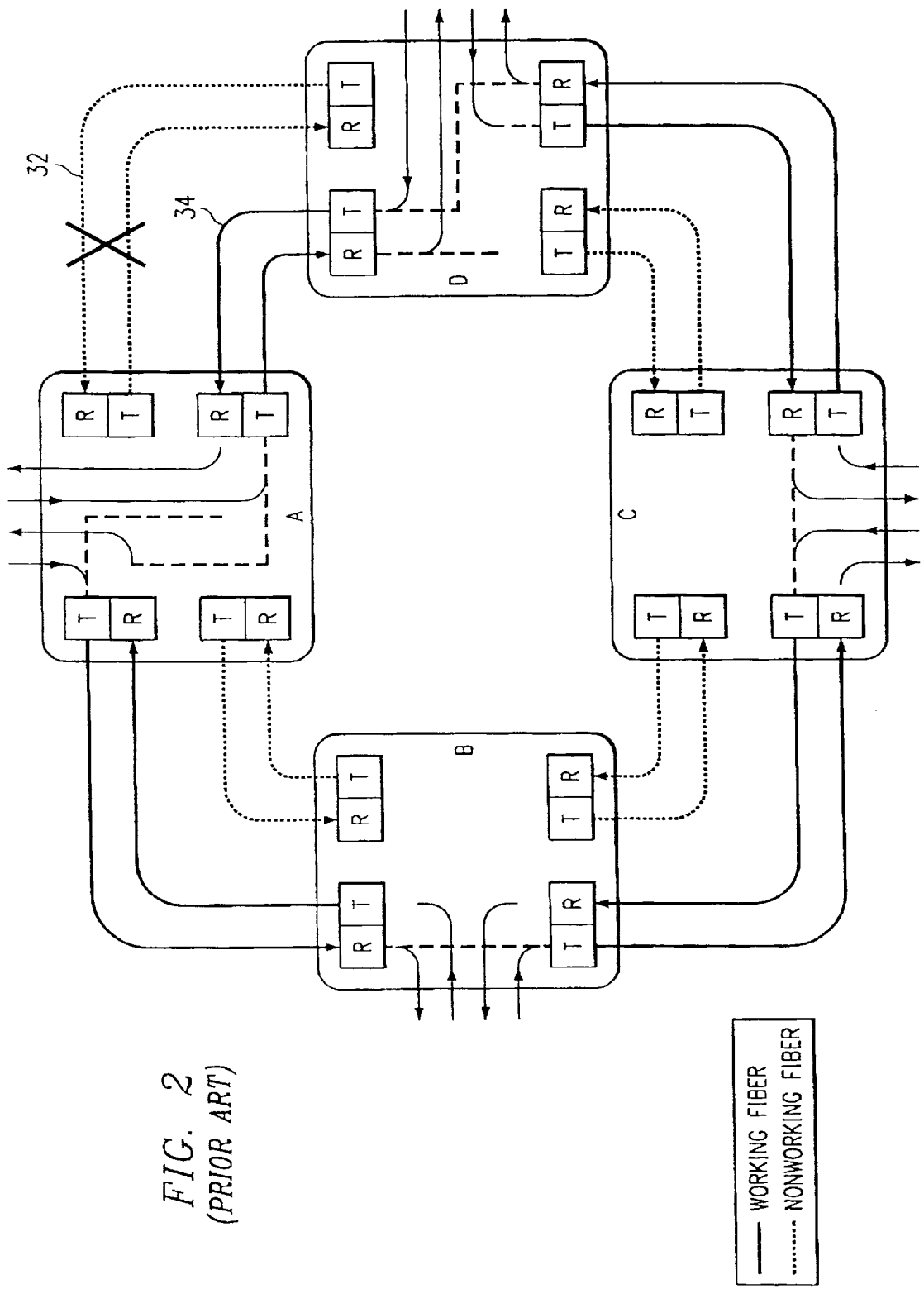
FIG. 2 illustrates a prior art bi-directional ring communication system performing a span switch.

Traffic protection in a bi-directional ring may be accomplished either on an individual path or a line (all paths together) basis. The primary failure to be protected is generally a break in a segment of the ring which would require that all the working paths over that segment be simultaneously protected. For this reason only the line basis for protection is considered here—such rings are referred to as bi-directional line switched rings (BLSRs). Depending on the ring physical architecture, two possible mechanisms are available for this protection. If the break is such that the protection paths in that segment are still functional (generally this implies that the working and protection paths are on physically different media), a span switch may be performed (see FIG. 2) where the working traffic on that particular failed segment 32 is rerouted through the protection paths 34. This protection mechanism, while having the advantage that simultaneous span switches can occur in different segments of the ring at the same time and that only the ADMs 20 adjacent to the break (in the example of FIG. 2, ADMs labeled A and D) are involved in the protection operation, will not work if the protection paths have also failed.

Figure 3:
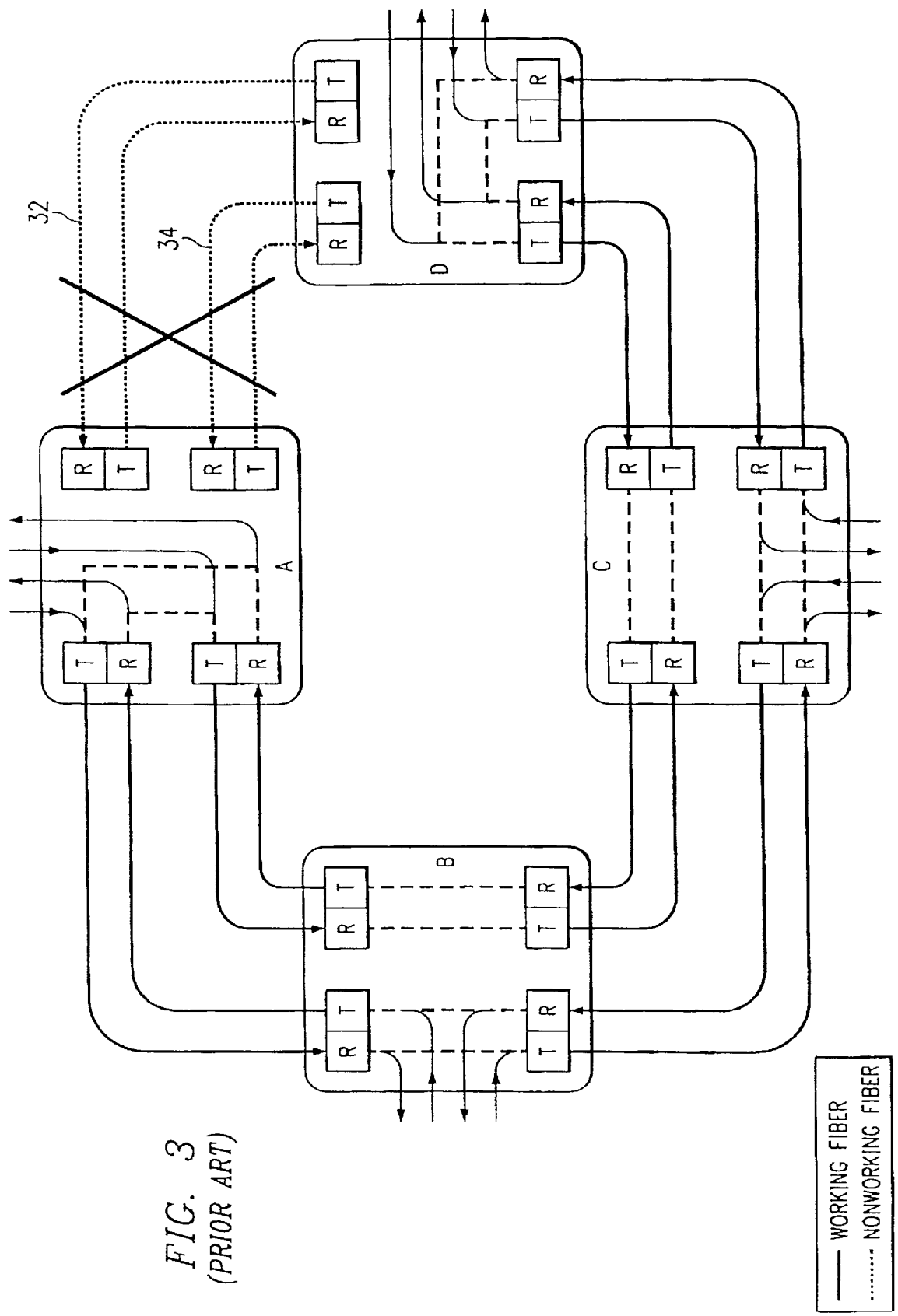
FIG. 3 illustrates a prior art bi-directional ring communication system performing a ring switch.
Figure 4A:
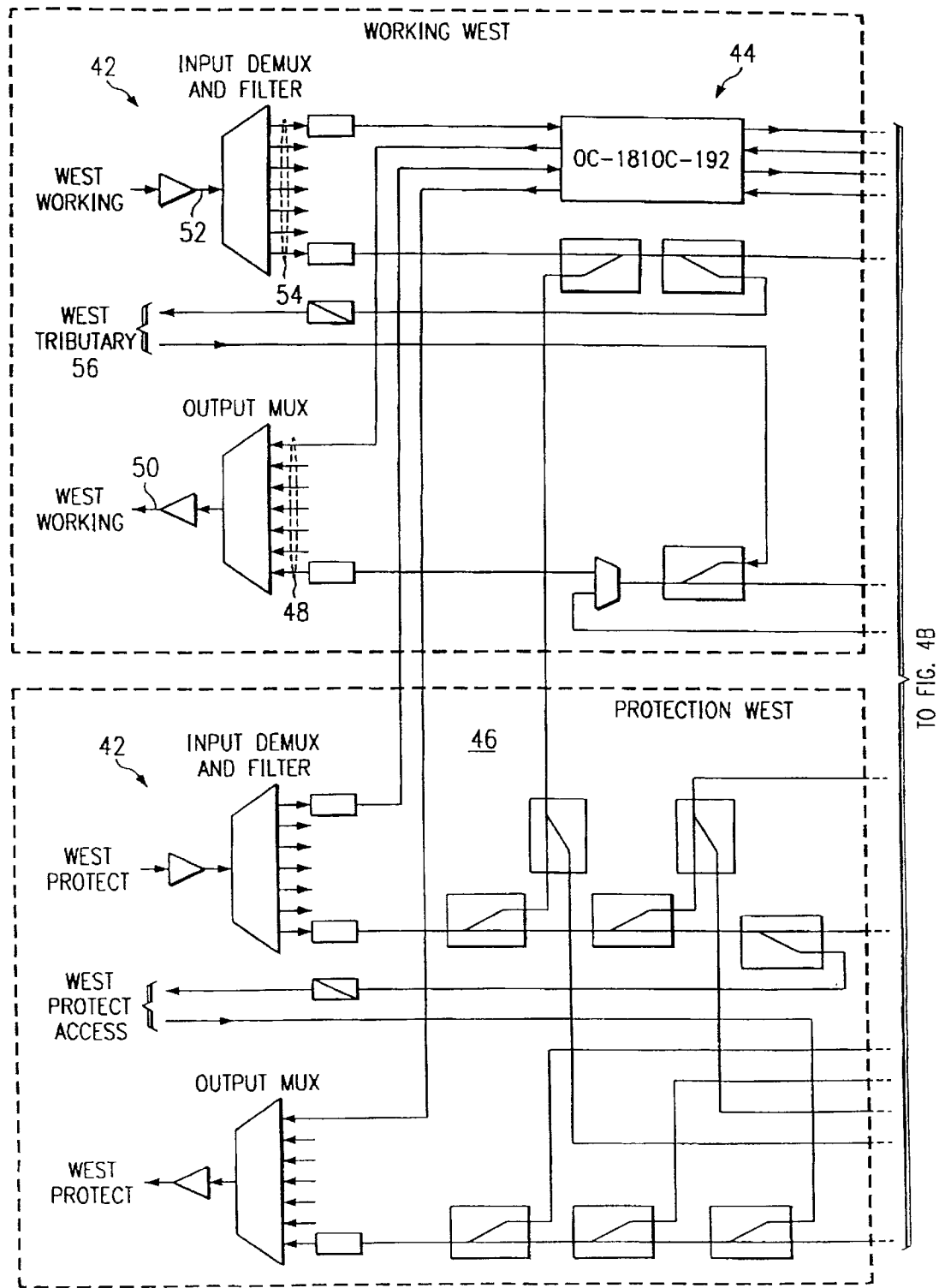
FIG. 4 illustrates a schematic diagram of an add/drop multiplexer (ADM) for an optical four-fiber bi-directional line switched ring communications system in accordance with the present invention.
Figure 4B:
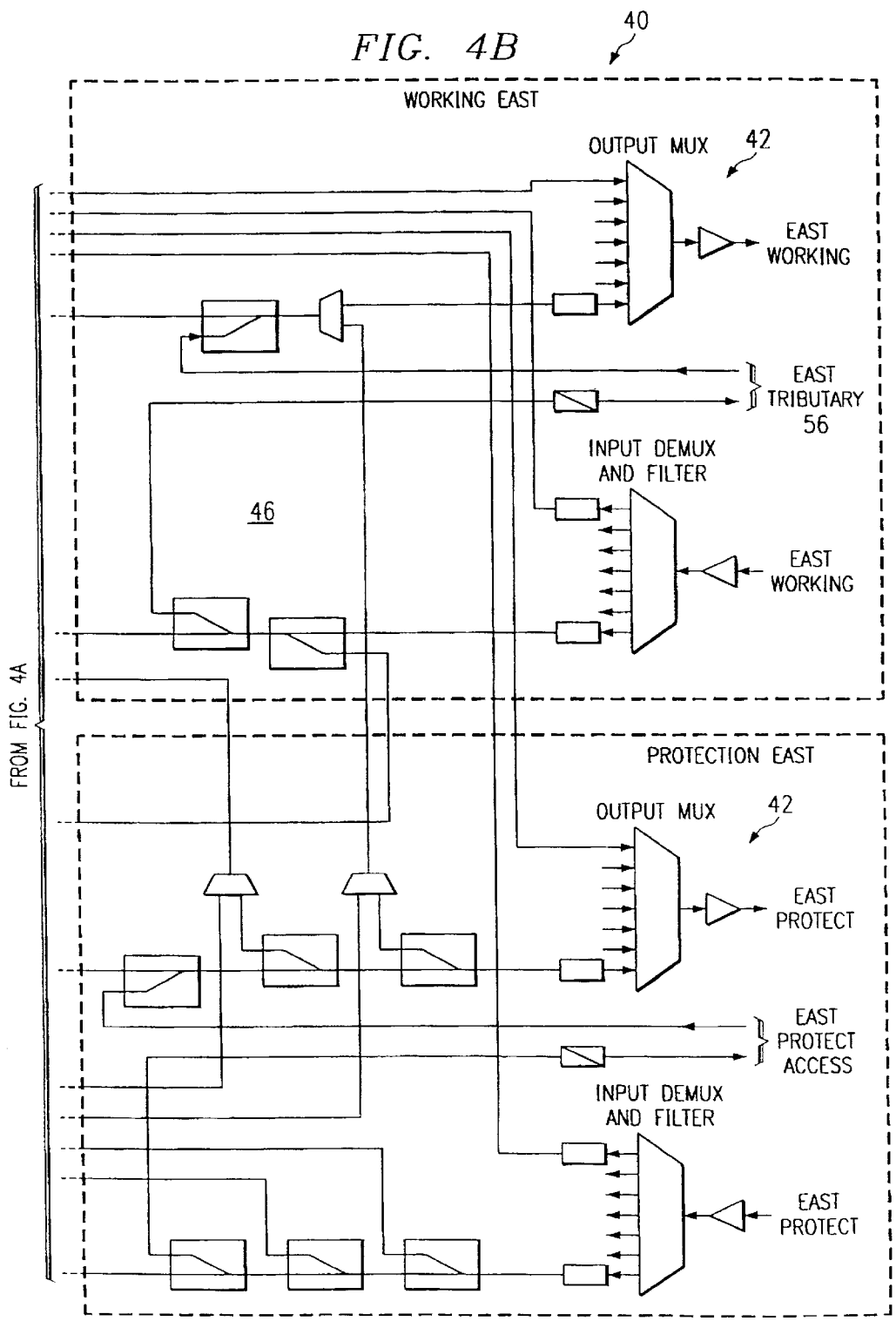

In cases where the protection paths 34 over the broken segment have also failed, a second protection mechanism, called a ring switch, may be performed as shown in FIG. 3. In a ring switch, the two ADMs 20 adjacent to the broken segment (again labeled A and D) loop the traffic that would have gone across the broken segment into their protection paths going in the opposite direction around the ring. The remaining ADMs pass the looped traffic on the protection paths, thus creating a new loop. This effectively reconstructs the ring by replacing the broken segment with the protection path around the remaining circumference of the ring. While a ring switch is a more general protection mechanism than a span switch, it has two disadvantages: (1) only one ring switch can occur in a ring at one time (otherwise the ring segments into multiple unconnected subnetworks), and (2) executing a ring switch requires coordinated action by all the ADMs in the network (a more complicated and potentially slower task than the simpler span switch).

BLSR networks 10 are generally divided into two types. In the simplest type, generally referred to as a two-fiber BLSR (2FBLSR), the working and protection paths share a single transmission media. Because of this shared media, 2FBLSR networks only protect via ring switching. The other type, generally referred to as a four fiber BLSR (4FBLSR), the working and protection paths are carried on separate media and both span and ring switching are supported. Because of the ability to survive some faults by span protection at multiple points around the ring and the fact that such faults often mirror situations caused by maintenance activities, 4FBLSR networks are generally preferred when the ring network is geographically large. This is the case in inter-exchange telecommunications applications. Electrical 2FBLSR and 4FBLSR networks implemented in optical time division multiplexed systems using Synchronous Optical Network (SONET) transmission protocols are limited in capacity to the highest transmission rates available in SONET, currently between 2.5 GB/s and 10 GB/s. The capacity over a given set of fibers can be increased by wave-division multiplexing (WDM), where multiple wavelengths of different optical SONET signals are combined a single fiber. However, the WDM approach creates a set of "stacked" rings having ADMs for each of the rings appearing at each node of the network. The complexity of a SONET ADM is such that each of these ADMs has significant cost even if little or no traffic is added/dropped by the ADM at that point in the ring network. The cost is further increased by the fact that much of the add/drop traffic is brought to the ring ADM in an optical format, but must be converted to electrical format by the ADM before it can be converted back to the ring's optical format for inclusion in the ADM's ring path traffic.

The present invention provides an optical BLSR which replaces each of the WDM/ADM complexes with a single "optical ADM" 40 which takes the optical add/drop signals (consisting of a single wavelength per signal) and directly multiplexes them, via WDM technology, into the selected ring paths. Thus the individual wavelengths are the paths in the optical BLSR. These "optical ADMS" 40 then provide both the grooming of the path traffic for adding or dropping as well as the ring and span protection switching of-these now optical paths as a single "line" group. Since this eliminates the need to convert the incoming optical add/drop signals to electrical and back to optical, and since optical switching devices are much cheaper than the complex high speed electronics, this results in a considerable cost savings. In addition, the "optical ADM" 40 performs ring and span switching via optical switches, which results in a significant cost savings over the electrical ADM solutions.

Desirable Characteristics for an Optical BLSR

To make a functional optical bi-directional line switched ring, several problems need to be addressed. These include the following items:

1. The optical ADMs should be able to monitor the quality of the "line" signal for each of the spans between the ADMS. This monitor must provide a true indication of the signals health—for example, the mere presence of an optical signal, or laser light, is not sufficient as it does not indicate whether any information can be extracted from the signal. Thus, the monitoring should provide a true measure of the ability of the signal to accurately deliver information. Since each of the optical paths has such monitoring information (the SONET BIP-8 for example is embedded: in each optical signal and describes the quality of that signal relative to its original source), it is tempting to use those as quality indicators. Unfortunately, this is inadequate as the signal may be corrupted prior to arriving at the optical ADM's add/drop inputs—using this quality would then lead to ring and span switches that could not correct. the problem of the corrupted signal. Thus the optical ADM must not only be able to monitor the signal quality but that quality must be an accurate indicator of the "line" transmission itself and not influenced by conditions outside of that "line" facility.

2. In addition to supporting ring and span switching to protect against problems in the ring's fibers, the optical ADMs should support protection of the individual add/drop facilities feeding the ADM. if one of those paths fails, it should be protected so that the customer's traffic is delivered to the final destination. As noted in (1), this protection must be independent of the ring and span protection.

3. To perform an optical ring or span switch, the optical ADMs should be able to communicate the necessary signals between themselves at a minimum of two nodes (ADMS) for a span switch, or all nodes for a ring switch. This is important because the ADMs must perform the switch simultaneously. To meet customer expectations, communication of the necessary control signals and subsequent switching actions should be performed within a 50–100 millisecond time frame. As the ADMs do not normally have access to any other network or communications means, these communications should be performed over the optical fibers between the ADMS. This requires a high speed data channel between the ADMS. In an example embodiment, a 1–2 millisecond message time between sites would be needed to meet the switching time requirements.

4. For operational maintenance purposes, the optical ring should provide a maintenance communications channel, consisting of both data (to monitor the quality of the sites around the ring from a remote maintenance station) and audio channels (to provide maintenance personnel with intersite voice communications to resolve problems and coordinate activities). Unlike the signaling channel in item (3), this data channel can be much slower (1–2 seconds) but should accommodate a considerable volume of information as a fault at a site can generate several hundred or thousand bytes of information to facilitate diagnostics and maintenance.

5. The optical ADMs can be separated by considerable distances. To traverse these distances, the customer's network often includes devices such as optical amplifiers, wave division multiplexers, and SONET repeaters between the optical ADMS. As much of this equipment already exists and will be in place prior to the use of optical ADMS, it is desirable that the optical ADMs be useable on a network with such equipment in place. Therefore, the means that the optical ADMs use to accomplish functions (1), (3) and (4) should be compatible with existing equipment. Thus, if the optical ADMs generate any new optical signals or add new overhead into existing SONET signals, these additions must be transparent to the existing equipment.

6. To support the BLSR functions, the optical ADMs should be able to physically perform the ring and span switching required by the network. They should also be able to perform add/drop grooming of signals and pass-through functions. BLSR protocols also require that the optical ADMs perform squelching during network node failures to prevent misconnections of traffic. Finally, the physical design of the ADM must be such that maintenance can be performed on individual channels (single optical wavelengths) and component modules without affecting other traffic.

Figure 7A:
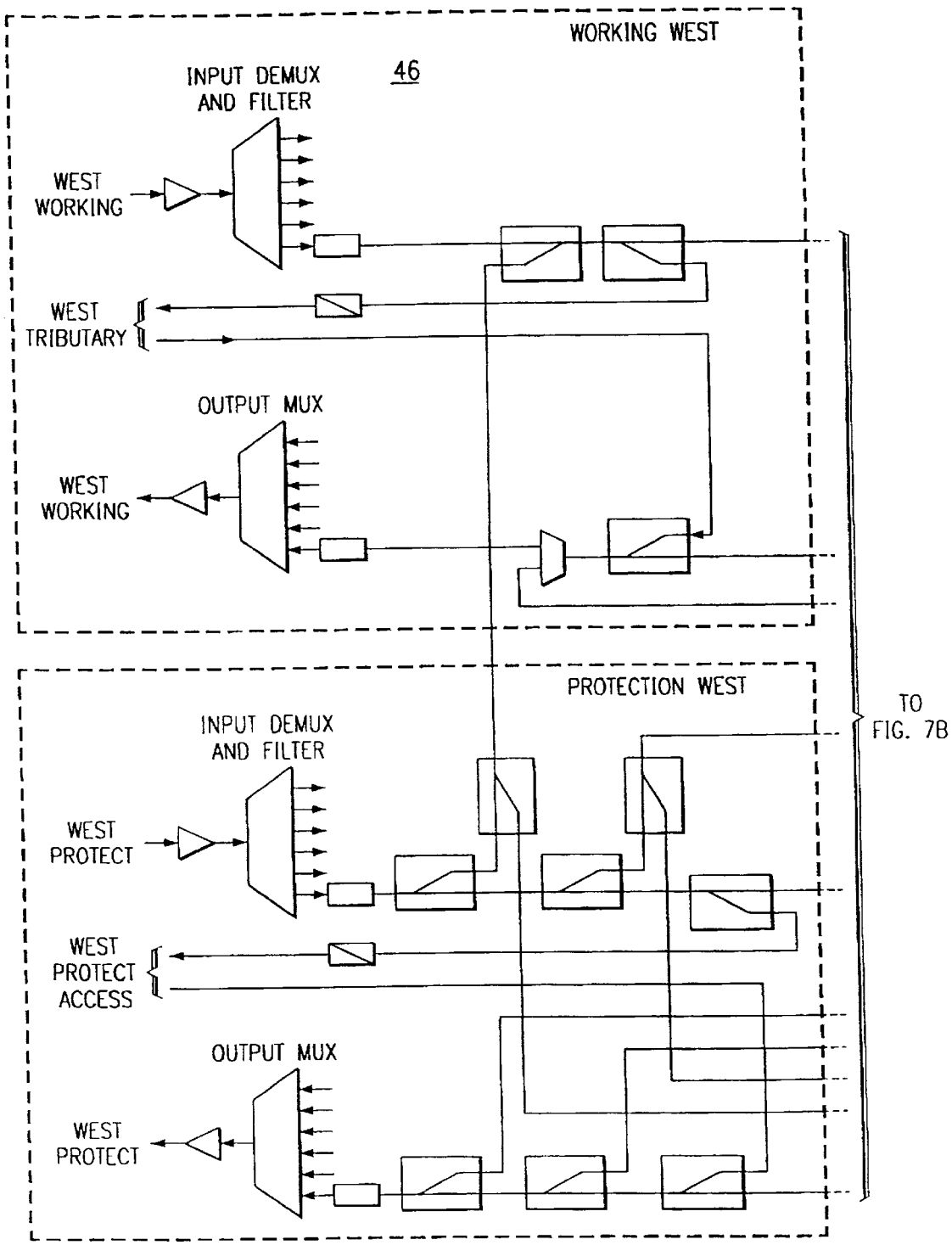
FIG. 7 illustrates a schematic diagram of optical slave circuits for an optical four-fiber bi-directional line switched ring communications system in accordance with the present invention.
Figure 7B:
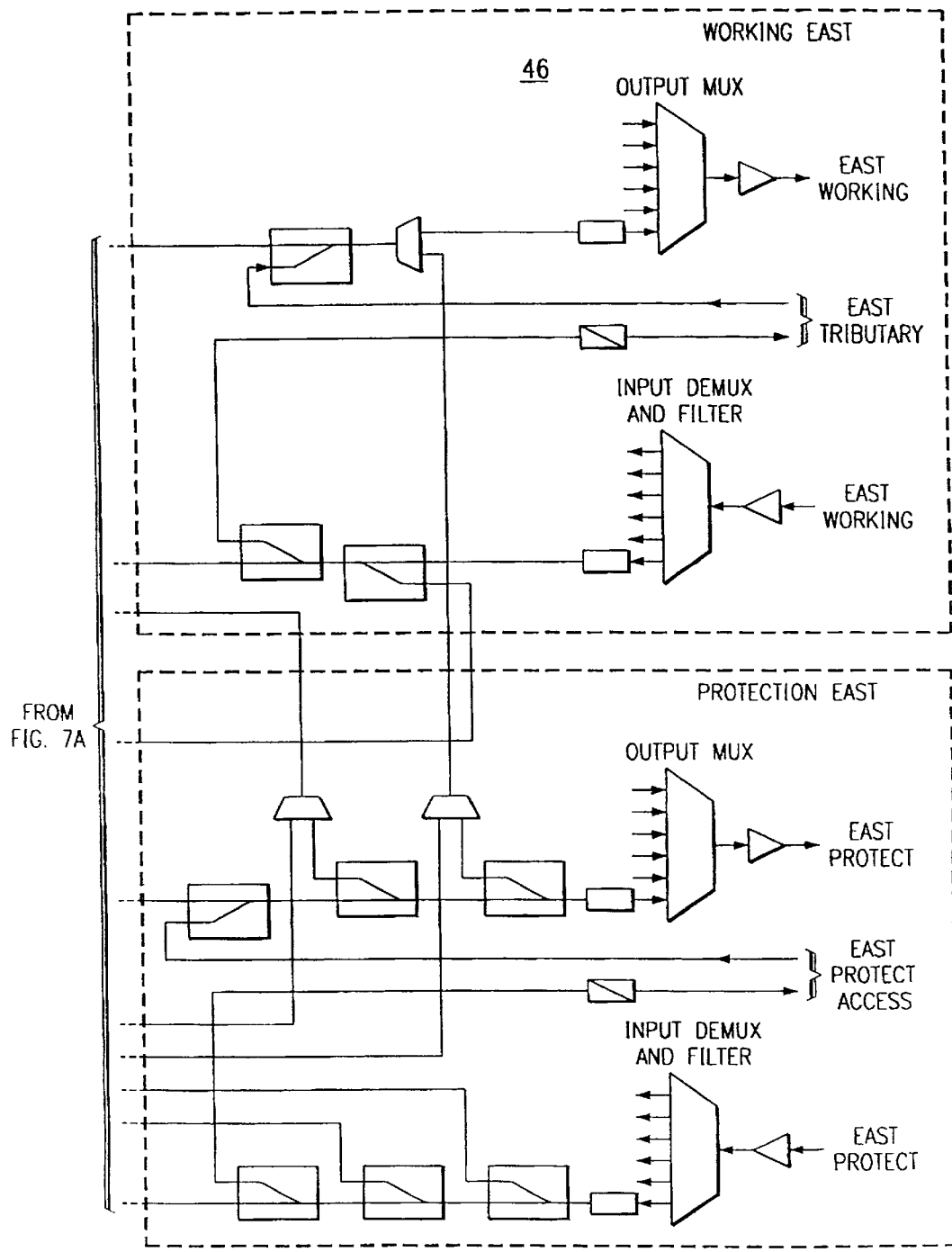

FIGS. 4–7 illustrate an optical BLSR system to satisfy the requirements identified in the previous section. The design is intended to transport N wavelengths of signals where N is at least two. The design is broken down into three major sections. The first section is a wave division multiplex/demultiplex section 42 that combines/splits the "line" signal into its individual wavelength components. The second section is a command and control channel 44 consisting of one wavelength on each fiber and an accompanying SONET standard BLSR ADM, which is illustrated in FIG. 6. The third section is a set of (N-1) slave circuits 46 as depicted in FIG. 7. Each slave circuit 46 can comprise from one to four slave channels in the embodiments shown. In a 4FBLSR, the wave division multiplex/demultiplex section 42 includes four copies of the multiplex function (labeled OUTPUT MUX in FIG. 4), and four copies of the demultiplex function (labeled INPUT DEMUX AND FILTER in FIG. 4). This multiplexer function receives the individual wavelengths on separate input fibers 48 generated by the other sections, adjusts them if necessary for compatibility with the optical amplifiers and repeaters used elsewhere in the ring, and multiplexes them into the single fiber output signal 50. The corresponding demultiplex function splits the incoming combined signal 50 into N individual wavelengths on separate output fibers 54 into the other sections, again adjusting them if necessary for compatibility.

Figure 5B:
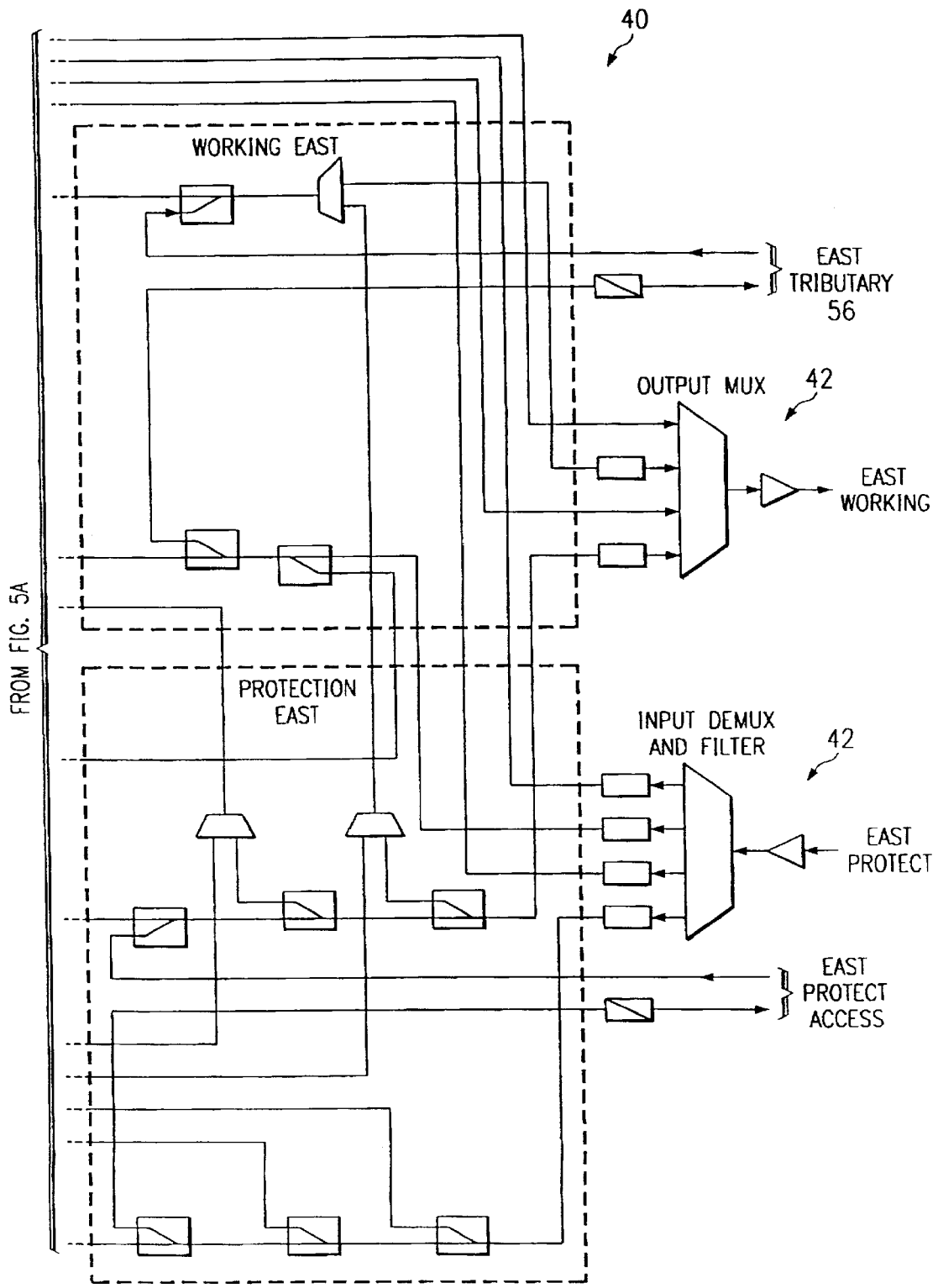
FIG. 5 illustrates a schematic diagram of an add/crop multiplexer (ADM) for an optical two-fiber bi-directional line switched ring communications system in accordance with the present invention.

In a 2FBLSR, only two copies of the optical multiplex and demultiplex functions 42 are used, as shown in FIG. 5. The multiplex and demultiplex functions are now partitioned into working and protection wavelengths, with half of the wavelengths assigned as the working bandwidth and the remaining half as the protection bandwidth. The control structure is identical between the 2FBLSR and the 4FBLSR. In a 2FBLSR, since the working and protection bandwidth now share a single fiber, failures will affect both the working and protection bandwidths on a single span, therefore a span switch is not possible in the 2FBLSR. These multiplex and demultiplex sections 42 are carrying signals that are fully compliant with existing systems. While no specific demands are placed on this section of the system, it is assumed that failures in the multiplex/demultiplex section either affect only one individual wavelength or affect all wavelengths, an assumption which is generally satisfied by existing equipment.

The command and control section 44, as illustrated in FIG. 7, provides the "line" monitoring, switching signaling, and overall control of the optical BLSR ADM 40. It also carries 1/Nth of the traffic of the system via the electrical SONET ADM's tributaries 56 and high speed optical lines. To provide the "line" monitoring of the overall optical ADM, the SONET ADM uses its own generated line signals with their inherit BIP--8 line parity checking. Any degradation or cut in the combined fiber signal can reasonably be assumed to affect all carried wavelengths on that fiber equally. Thus any "line" fault will be detected by the SONET ADM 40 and, in its normal course of actions, protected by its BLSR switching protocol and hardware. The protocol it uses is embedded in the standard SONET overhead bytes (K1/K2 in SONET terminology) carried in the SONET ADM's high speed overhead channels. These same overhead channels (bytes D1–D12 and E1/E2 in SONET terminology) also provide the optical ADM's maintenance channels for maintenance data traffic and maintenance voice communications. By using these channels and signaling of the SONET ADM, the design provides the requirements for items (1), (3) and (4) while meeting the needs imposed by item (5). It also provides item (2) requirements for the one set of payloads carried by the SONET ADM itself. Note that the SONET ADM actually only directly protects its own high speed wavelength signal by performing ring or span switches upon its high speed fibers. To carry and protect each of the other wavelength signals, each of the (N-1) slave circuits 46 has the optical hardware necessary to perform a ring or span switch of its own signal, see FIG. 7. The use of this hardware is slaved to control information provided by the SONET BLSR ADM in the command and control section 44. Thus, when the SONET ADM 40 performs a ring or span switch or a release of the same, the slave sections perform the equivalent physical function for their individual wavelengths. The providing of this control information, as well as the related squelching information, is the modification required of the SONET ADM used for command and control. The slave sections also provide, as shown in FIG. 7, the switching for adding and dropping optical signals at their respective wavelengths.

In this invention, switching is not necessary in the optical ADM to provide protection for failures in the slave channels add/drop facilities. Instead, both the working and protection add/drop facilities from the feeding tributary systems are carried as individual wavelengths in the optical ADM. Should a failure occur either in an add/drop facility or in a single wavelength along the signal path in the optical ring, the normal protection provided by the feeding tributary systems will move the failed traffic to the feeding protection wavelength. This has the advantage of providing both the necessary add/drop protection and keeping the add/drop protection independent of the optical "line" protection thus fulfilling the requirements of item (2).

In another embodiment of the present invention, an optical BLSR network includes a plurality of optical BLSR rings, wherein at least one of the optical BLSR rings is an optical BLSR ring as described with reference to FIGS. 4–7 above. In such a system, it is desirable to transmit data between a first BLSR ring and a second BLSR ring. FIG. 8 illustrates an embodiment allowing for such data transmission.

The system of FIG. 8, which may be referred to as a dual-node interconnected ring system 60, allows data to be transmitted from the first ring 62 to the second ring 64 with a high degree of fault protection. Data is transmitted from a first ADM 66 on the first ring to a first ADM 68 on the second ring, and the same data is transmitted from the second ADM 70 on the first ring to the second ADM 72 on the second ring. By transferring the data at two separate nodes, redundancy is established such that if there is a problem with either ring or with one of the nodes, an alternate path exists for the data. Connecting to each input multiplexer is a monitor that permits looking for loss of signal defected signals.

What is claimed is:

1. A multiple fiber optical bi-directional line switched ring capable of transporting N wavelengths of signals comprising a plurality of optical add/drop multiplexer nodes, each optical add/drop multiplexer node comprising:

multiple input demultiplexer/output multiplexer sections, each section comprising an input demultiplexer and an output multiplexer coupled to one of the multiple fibers;

a command and control channel having multiple fibers wherein each command and control channel fiber is coupled to one of the input demultiplexer/output multiplexer sections; and up to N-1 slave circuits, each slave circuit comprising a plurality optical switching circuits coupled to the multiple input demultiplexer/output multiplexer sections such that the optical switching circuits are operable to carry up to N wavelengths of traffic;

wherein the command and control channel monitors signals on the plurality of fibers and controls the operation of the N-1 slave circuits in response to the signals sensed on the plurality of fibers.

2. The system of claim 1, wherein the multiple fiber optical bi-directional line switched ring is a four fiber optical bi-directional line switched ring having two working channels and two protection channels, and wherein the multiple input demultiplexer/output multiplexer sections comprises four input demultiplexer/output multiplexer sections and the command and control channel has four fibers, and further wherein each of the input demultiplexers receives either a working channel or a protection channel of one of the four fibers.

3. The system of claim 1, wherein the plurality of optical add/drop multiplexer nodes contains from two to sixteen optical add/drop multiplexer nodes.

4. The system of claim 1, wherein the N-1 slave circuits each comprises two tributaries to provide up to 2N-2 optical wavelengths of fully protected working traffic.

5. The system of claim 4, wherein each tributary resides in one of the N wavelengths.

6. The system of claim 1, wherein the N-1 slave circuits each comprises two tributaries to provide up to 4N-4 optical wavelengths of tributaries of traffic add/dropped at each node, where 2N-2 wavelengths of the traffic is fully protected working traffic.

7. The system of claim 1, wherein each of the N-1 slave circuits further comprises up to four slave channels, and wherein at least one of the slave channels is a protection channel for the slave circuit.

8. The system of claim 1, wherein the command and control channel is an electrical multiple fiber bi-directional ring add/drop multiplexer.

9. The system of claim 1, wherein each input demultiplexer receives an incoming signal from another node and demultiplexes that incoming signal into N wavelengths where N represents the multiplexing capability of each input demultiplexer in a particular node and wherein each output multiplexer receives the N wavelengths from within the node and multiplexes the N wavelengths into an outgoing signal.

10. The system of claim 9, wherein each N-1 slave circuit further comprises up to 4 slave channels, and wherein each slave channel is operable to carry one wavelength of the N wavelength demultiplexed incoming signal if a failure occurs requiring protection of that incoming signal.

11. The system of claim 1, further comprising:

a second multiple fiber optical bi-directional line switched ring; and a drop and continue section coupling the first multiple fiber optical bi-directional line switched ring to the second multiple fiber optical bi-directional line switched ring, the drop and continue section for transmitting data from a first add/drop multiplexer on the first ring to a first add/drop multiplexer on the second ring.

12. The system of claim 11, wherein the drop and continue section further operates to transmit data from a second add/drop multiplexer on the first ring to a second add/drop multiplexer on the second ring.

13. The system of claim 1, wherein the command and control channel generates a signal on each of its multiple fibers that is carried on each of the multiple fibers of the multiple fiber optical bi-directional line switched ring so that by monitoring the quality of its command and control channel signal effectively monitors the quality of each signal on the multiple fibers.

14. The system of claim 13, wherein the command and control channel, upon detecting a fault in its command and control channel signal, initiates a switch to switch traffic from a first path to a second patch in the system.

15. The system of claim 14, wherein the switch further involves the command and control channel initiating a switch for the signal traveling through the command and control channel to a new path and the N-1 slave circuits execute a corresponding switch so that the remaining traffic will also switch to the new path.

16. The system of claim 15, wherein the command and control channel is in communication with each node in the system to negotiate a protection switch.

17. The system of claim 1, wherein the multiple fiber optical bi-directional line switched ring is a two fiber optical bi-directional line switched ring, and wherein the multiple input demultiplexer/output multiplexer sections comprises two input demultiplexer/output multiplexer sections, and further wherein each of the input demultiplexers receives either a working channel or a protection channel of one of the two fibers.

18. An optical add/drop multiplexer for use in a bi-directional line switched ring capable of transporting N wavelengths of optical signals comprising:

multiple input demultiplexer/output multiplexer sections, each section comprising an input demultiplexer and an output multiplexer coupled to one of the fibers;

a command and control channel having a plurality of fibers wherein each command and control channel fiber is coupled to one of the input demultiplexers or output multiplexers sections; and up to N-1 slave circuits, each slave circuit comprising a plurality of optical switching circuits coupled to at least one of the multiple input demultiplexer/output multiplexer sections such that the optical switching circuits are operable to carry up to N wavelengths of traffic;

wherein the command and control channel monitors signals on the plurality of fibers and controls the operation of the N-1 slave circuits in response to the signals sensed on the plurality of fibers.

19. The system of claim 18, wherein the multiple input demultiplexer/output multiplexer sections comprises four input demultiplexer/output multiplexer sections and the command and control channel has four fibers, and further wherein each of the input demultiplexers receives either a working channel or a protection channel of one of the four fibers.

20. The system of claim 18, wherein the N-1 slave circuits each comprises two tributaries to provide up to 2N-2 optical wavelengths of fully protected working traffic.

21. The system of claim 20, wherein each tributary resides in one of the N wavelengths.

22. The system of claim 18, wherein the N-1 slave circuits each comprises two tributaries to provide up to 4N-4 optical wavelengths of tributaries of traffic add/dropped at each node, where 2N-2 wavelengths of the traffic is fully protected working traffic.

23. The system of claim 18, wherein each of the N-1 slave circuits further comprises up to 4 slave channels, and wherein at least one of the slave channels is a protection channel for each N-1 slave circuit.

24. The system of claim 18, wherein the command and control channel is an electrical multiple fiber bi-directional switch.

25. The system of claim 18, wherein each input demultiplexer receives an incoming signal from another node and demultiplexes that incoming signal into N wavelengths where N represents the multiplexing capability of each input demultiplexer in a particular node and wherein each output multiplexer receives the N wavelengths from within the node and multiplexes the N wavelengths into an outgoing signal.

26. The system of claim 25, wherein each of the N-1 slave circuits further comprises up to 4 slave channels, and wherein each slave channel is operable to carry one wavelength of the N wavelength demultiplexed incoming signal if a failure occurs requiring protection of that incoming signal.

27. The system of claim 18, wherein the command and control channel generates and monitors a signal on each of its multiple fibers, and upon detecting a fault in any of its command and control channel signals, initiates a switch to switch traffic from a first path to a second patch in the system.

28. The system of claim 27, wherein the switch further involves the command and control channel initiating a switch for the signal traveling through the command and control channel to a new path and the N-1 slave circuits execute a corresponding switch so that the remaining traffic will also switch to the new path.

29. A method for providing protection of traffic traveling in a multiple fiber optical bi-directional line switched ring capable of transporting N wavelengths of signals, where the multiple fiber optical bi-directional line switched ring includes a plurality of optical add/drop multiplexer nodes, each optical add/drop multiplexer node having multiple input demultiplexer/output multiplexer sections, each section comprising an input demultiplexer and an output multiplexer coupled to one of the multiple fibers, a command and control channel having multiple fibers wherein each command and control channel fiber is coupled to one of the input demultiplexer/output multiplexer sections, and up to N-1 slave circuits, each slave circuit comprising a plurality optical switching circuits coupled to the multiple input demultiplexer/output multiplexer sections such that the optical switching circuits are operable to carry up to N wavelengths of traffic, the method comprising:

receiving a signal at each of the input demultiplexers;

demultiplexing the signal into N wavelengths;

sending one wavelength to the command and control channel;

sending the remaining N-1 wavelengths to N-1 slave circuits;

monitoring the command and control channel wavelength signal for signal quality; and controlling the operation of the N-1 slave circuits in response to signal quality of the command and control channel wavelength signal.

30. The method of claim 29, further comprising:

upon detecting a fault in the command and control channel signal, initiating a switch to switch traffic from a first path to a second patch in the system.

31. The method of claim 30, wherein initiating a switch further comprises initiating a switch for the command and control channel wavelength by the command and control channel and initiating a switch for the N-1 wavelengths by the N-1 slave circuits, wherein each of these switches the N wavelengths to a corresponding path.

32. The method of claim 29, wherein the multiple fiber optical bi-directional line switched ring is a four fiber optical bi-directional line switched ring having two working channels and two protection channels, and wherein the multiple input demultiplexer/output multiplexer sections comprises four input demultiplexer/output multiplexer sections and the command and control channel has four fibers, and further wherein each of the input demultiplexers receives either a working channel or a protection channel of one of the four fibers.

33. The method of claim 29, wherein the N-1 slave circuits each comprises two tributaries to provide up to 4N-4 optical wavelengths of tributaries of traffic add/dropped at each node, where 2N-2 wavelengths of the traffic is fully protected working traffic and wherein each tributary resides in one of the N wavelengths.

34. The method of claim 29, wherein each of the N-1 slave circuits further comprises up to 4 slave channels, and the method further comprising:

providing protection to each of the N-1 slave circuits via at least one of the slave channels in each of the N-1 slave circuits.

35. The method of claim 29, further comprising:

coupling a second multiple fiber optical bi-directional line switched ring to the first multiple fiber optical bi-directional line switched ring; and coupling a drop and continue section between the first multiple fiber optical bi-directional line switched ring and the second multiple fiber optical bi-directional line switched ring; and transmitting data via the drop and continue section from a first add/drop multiplexer on the first ring to a first add/drop multiplexer on the second ring.

36. The method claim 35, further comprising:

transmitting data via the drop and continue section from a second add/drop multiplexer on the first ring to a second add/drop multiplexer on the second ring.

37. The method of claim 29, wherein the multiple fiber optical bi-directional line switched ring is a two fiber optical bi-directional line switched ring having two working channels and two protection channels, and wherein the multiple input demultiplexer/output multiplexer sections comprises two input demultiplexer/output multiplexer sections, and further wherein each of the input demultiplexers receives either a working channel or a protection channel of one of the two fibers.

* * * * *